(12) United States Patent
Aono et al.

(10) Patent No.: US 9,361,022 B2
(45) Date of Patent: Jun. 7, 2016

(54) CHARACTER INPUT APPARATUS

(71) Applicant: FUJITSU TEN LIMITED, Kobe-shi, Hyogo (JP)

(72) Inventors: Tetsuaki Aono, Kobe (JP); Takashi Ohta, Kobe (JP); Takaho Okada, Kobe (JP); Masahiro Iino, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 312 days.

(21) Appl. No.: 14/029,086

(22) Filed: Sep. 17, 2013

(65) Prior Publication Data

US 2014/0157180 A1 Jun. 5, 2014

(30) Foreign Application Priority Data

Nov. 30, 2012 (JP) ................................. 2012-261790

(51) Int. Cl.
*G06F 3/0488* (2013.01)

(52) U.S. Cl.
CPC .. *G06F 3/04886* (2013.01); *G06F 2203/04808* (2013.01)

(58) Field of Classification Search
CPC .............. G06F 3/0488; G06F 3/04886; G06F 2203/04808
USPC .......................................................... 715/773
See application file for complete search history.

(56) References Cited

U.S. PATENT DOCUMENTS

| 2006/0161870 A1* | 7/2006 | Hotelling | G06F 3/0485 715/863 |
| 2012/0162083 A1* | 6/2012 | Zhu | G06F 3/04886 345/168 |
| 2015/0052481 A1* | 2/2015 | Ronkainen | G06F 3/0416 715/815 |

FOREIGN PATENT DOCUMENTS

| JP | A-2002-091676 | 3/2002 | |
| JP | A-2009-205303 | 9/2009 | |
| JP | A-2012-048701 | 3/2012 | |
| KR | WO 2012070705 A1 * | 5/2012 | .............. G06F 3/018 |

* cited by examiner

*Primary Examiner* — Jennifer To
*Assistant Examiner* — John Repsher, III
(74) *Attorney, Agent, or Firm* — Oliff PLC

(57) ABSTRACT

A plurality of characters that are candidates for entry are displayed on a display surface of a display corresponding to an operation surface of a touch panel as character buttons. A touch detector judges whether a user touches the operation surface either with a single point or plural points, and detects a position touched by the user. An input receiver receives an entry of a character associated with a character button in the position touched by the user among the plurality of characters displayed on the display surface of the display. Then, the input receiver receives the entry of the character which varies in type depending on whether the user touches an area in the operation surface corresponding to an identical character button with a single point or plural points.

12 Claims, 15 Drawing Sheets

CHARACTER INPUT APPARATUS

BACKGROUND OF THE INVENTION

1. Field of the Invention

The invention relates to a technology for entering characters.

2. Description of the Background Art

In recent years, as a character input apparatus for a user to enter characters, a character input apparatus of a type equipped with a touch panel is prevalent. Such a character input apparatus including a touch panel displays character buttons that are command buttons corresponding to the characters which are candidates for entry. When the user touches an operation surface of the touch panel, the character input apparatus receives an entry of the character that corresponds to the character button in the position touched by the user.

By the way, since the operation surface size of the touch panel is limited, the character buttons that correspond to all characters which are the candidates for entry cannot be displayed simultaneously. Thus, the character buttons to be displayed are limited to relatively frequently-used characters, and an additional operation is required to enter different types of characters from these characters.

For example, when the user enters "Hiragana" used in Japanese, a plurality of character buttons corresponding to 46-basic kanas such as "SI," "HI," "TU," and "YA" are displayed in an initial state. Therefore, when the user enters each of the 46-basic kanas, the user may touch the character button corresponding to the character only once. On the other hand, when the user enters dakuon such as "JI" and "BI," handakuon such as "PI," and small-sized kanas such as "tu" and "ya," the operation or the like to touch a related character button of the basic kana, and to touch the command button for instructing the conversion of a type is required.

Also, for example, when the user enters the "alphabets" used in English and the like, the character buttons corresponding to only either type of characters of "upper case letters" or "lower case letters" are displayed in the initial state. Thus, when the user enters the other type of characters, an operation to switch the type of characters is required. Therefore, for example, when the user enters a sentence in which the "upper case letters" and the "lower case letters" are mixed, every time the user needs to enter another type of characters, the complicated operation for switching temporarily the type of characters is required.

As described above, the additional operation to enter the different types of characters from the characters to be displayed as character buttons in the initial state is complicated and reduces the input efficiency. Thus, the technology to enter the different types of characters efficiently has been desired.

SUMMARY OF THE INVENTION

According to one aspect of the invention, a character input apparatus includes: a display that displays a plurality of characters which are candidates for entry on a display surface corresponding to an operation surface of a touch panel; a first detector that judges whether a user touches the operation surface either with a single point or plural points, and that detects a position touched by the user; and a receiver that receives an entry of a character associated with the position touched by the user among the plurality of characters. The receiver receives the entry of the character which varies in type depending on whether the user touches an area in the operation surface corresponding to an identical character with a single point or plural points.

The user can easily enter the different types of characters by changing the number of fingers, etc. touching the operation surface.

According to another aspect of the invention, the character input apparatus further includes a second detector that detects a position in the operation surface where the user comes close to the operation surface without contacting the operation surface. The display emphatically displays a character in the position where the user comes close among the plurality of characters.

The user can comprehend that either character may be entered when the user touches the operation surface, in advance before touching the operation surface.

According to another aspect of the invention, a character input apparatus includes: a display that displays a character which is a candidate for entry on a display surface; and a detector that judges whether a user comes close to the display surface either with a single point or plural points, and that detects a position where the user comes close to the display surface without contacting the display surface. The display displays the character which varies in type depending on whether the user comes close to an area in the display surface corresponding to an identical character with a single point or plural points.

The user can comprehend the type of characters corresponding to the operation with a single point and the type of characters corresponding to the operation, with plural points.

Therefore, an object of the invention is to enable the user to easily enter the different types of characters.

These and other objects, features, aspects and advantages of the present invention will become more apparent from the following detailed description of the present invention when taken in conjunction with the accompanying drawings.

DESCRIPTION OF THE EMBODIMENTS

Hereinafter, embodiments of the invention are described with reference to the drawings.

1. First Embodiment

1-1. Configuration

Figure 1:
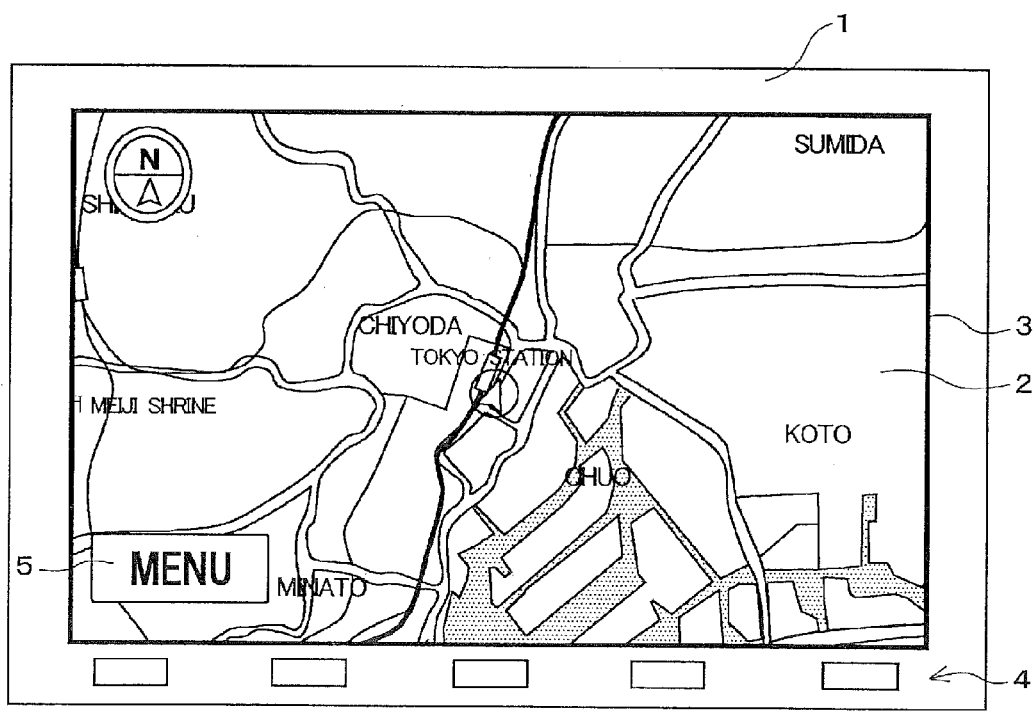
FIG. 1 illustrates an appearance of an on-vehicle apparatus.

FIG. 1 shows an appearance of an on-vehicle apparatus 1 that is a character input apparatus in this embodiment. The on-vehicle apparatus 1 is used in a vehicle, such as a car, and displays various kinds of information for a user, such as a driver, in a vehicle cabin. The on-vehicle apparatus 1 includes, as main functions, a navigation function that provides route guidance to a destination, and an audio function that outputs sounds in the vehicle cabin. The on-vehicle apparatus 1 also functions as the character input apparatus. For example, the user can enter characters when setting a destination in the navigation function and when changing a title of audio data in the audio function.

The on-vehicle apparatus 1 includes a display 3 that displays various kinds of information, and a touch panel 2 on which the user conducts operations by touching the panel. An operation surface of the touch panel 2 is disposed on a display surface of the display 3, and a position on the operation surface of the touch panel 2 corresponds to a position on the display surface of the display 3. The operation surface of the touch panel 2 is disposed on the user side of the display surface of the display 3.

On the display surface of the display 3, a command button 5 that receives an instruction by the user is displayed properly. The user can give the instruction associated with the command button 5 to the on-vehicle apparatus 1 by touching an area in the operation surface of the touch panel 2 corresponding to an area of the command button 5 with one or more fingers. Hereinafter, when the user touches the area in the operation surface of the touch panel 2 which corresponds to the area of the command button displayed on the display surface of the display 3, it is simply described as "the user touches the area of the command button."

For the method of the touch panel 2, for example, the capacitive sensing method that detects a position by measuring the change in electrostatic capacitance is adopted. The user can conduct not only a single-touch operation but also multi-touch that is the touching operation with plural points on the operation surface of the touch panel 2.

The on-vehicle apparatus 1 includes, on the periphery of the display surface of the display 3, an operation part 4 having a physical switch for the user to operate. The user can give various kinds of instructions to the on-vehicle apparatus 1 along with the touch panel 2, via the operation part 4.

Figure 2:
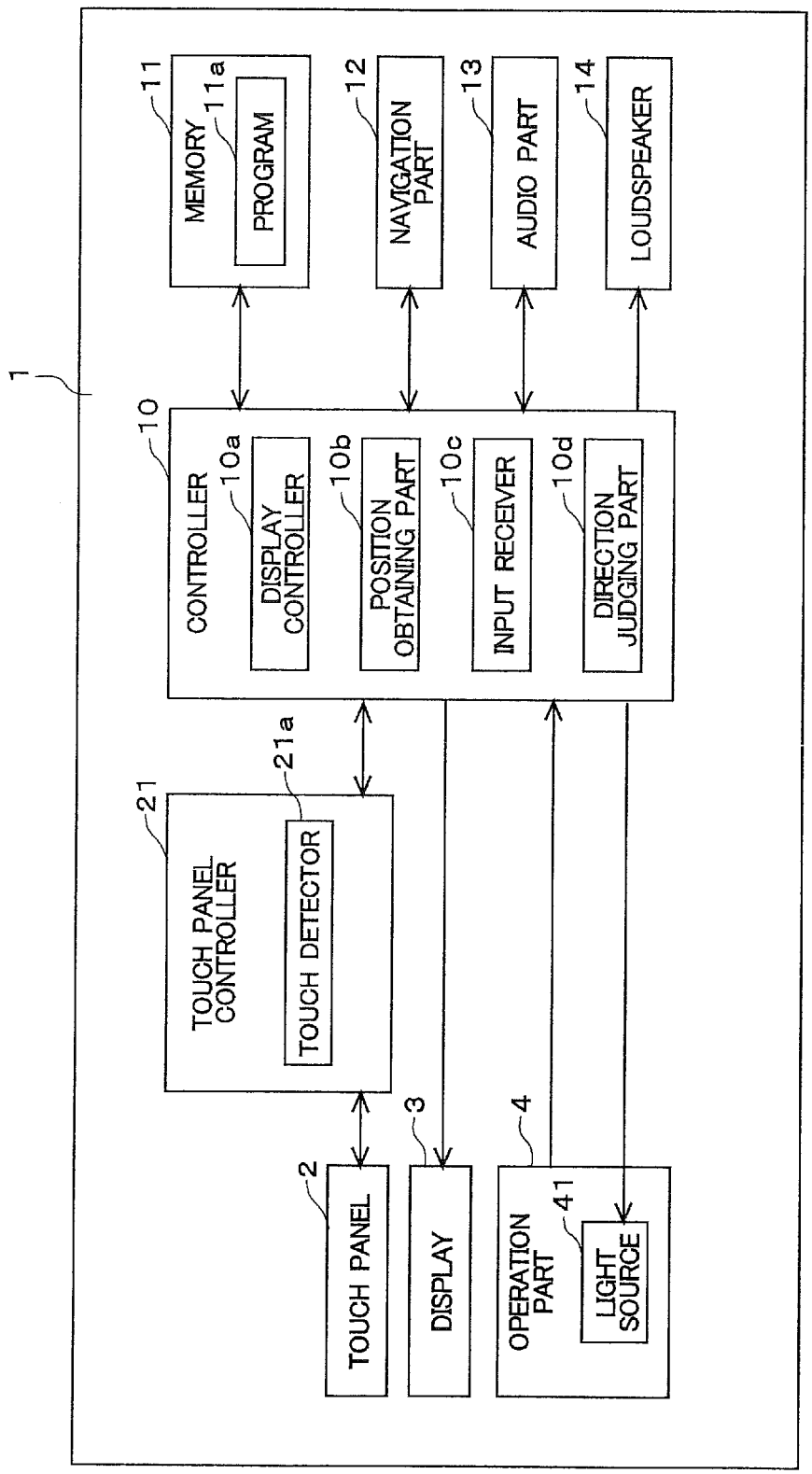
FIG. 2 is a block diagram illustrating a configuration of an on-vehicle apparatus in the first embodiment.

FIG. 2 is a block diagram showing a configuration of the on-vehicle apparatus 1. As shown in FIG. 2, the on-vehicle apparatus 1 includes a touch panel controller 21, a memory 11, a navigation part 12, an audio part 13 and a loudspeaker 14, in addition to the touch panel 2, the display 3 and the operation part 4 described above. The operation part 4 includes a light source 41, such as LED, which is capable of emitting a light of a predetermined color.

The touch panel controller 21 is, for example, a hardware circuit, and controls processing on the touch panel 2. The touch panel controller 21 includes a touch detector 21a that detects the position touched by the user in the operation surface of the touch panel 2 based on the signal generated by the touch panel 2.

The touch detector 21a detects the position touched by the user using the mutual capacitance method that measures the change in the electrostatic capacitance between a driving electrode and a receiving electrode. The touch detector 21a detects whether the user touches, based on the reduction in charge received by the receiving electrode due to an interruption in electric field by the user's finger. The touch detector 21a is capable of judging whether the user touches the operation surface of the touch panel 2 either with a single point or plural points. Then, when the user touches the operation surface of the touch panel 2 with a single point, the touch detector 21a detects the position of the single point. When the user touches the operation surface with plural points, the touch detector 21a detects the respective positions of the plural points. The touch detector 21a is capable of detecting, for example, positions of up to ten points as the positions touched by the user.

The memory 11 is a non-volatile memory, such as a flash memory, that is capable of storing various kinds of data. The memory 11 stores various data necessary for the processing on the on-vehicle apparatus 1, and a program 11a.

The navigation part 12 implements the navigation function that provides the route guidance to a destination, using a map stored in the memory 11. The audio part 13 implements the audio function that outputs sounds via the loudspeaker 14, using the audio data stored in the memory 11.

The on-vehicle apparatus 1 includes a controller 10 that controls the whole of the apparatus. The controller 10 is, for example, a microcomputer including a CPU, RAM and ROM. Since the CPU executes the program 11a stored in the memory 11, various kinds of functions of the controller 10 are implemented. The program 11a is obtained by reading out from a non-transitory computer-readable recording medium such as a memory card, and is stored in the memory 11 in advance. When the on-vehicle apparatus 1 includes a communication function through networks, the program 11a may be obtained by communicating with another communication apparatus.

Each of a display controller 10a, a position obtaining part 10b, an input receiver 10c, and a direction judging part 10d shown in the figure is a part of the functions of the controller 10 to be implemented by execution of the program 11a. These functions 10a, 10b, 10c and 10d relate to the reception of the character entry from the user.

The display controller 10a controls the content to be displayed by the display 3. The display controller 10a causes the display surface of the display 3 to display, for example, a command button to receive the user instruction. When receiving the character entry from the user, the display controller 10a causes the display surface of the display 3 to display plural character buttons that are the command buttons corresponding to the characters which are the candidates for entry.

The position obtaining part 10b obtains the position touched by the user in the operation surface of the touch panel 2. The position obtaining part 10b judges whether the user touches the operation surface either with a single point or plural points based on the signal from the touch detector 21a of the touch panel controller 21, and obtains the position touched by the user. When the user touches the operation surface of the touch panel 2 with a single point, the position obtaining part 10b obtains the position of the single point. When the user touches the operation surface with plural points, the position obtaining part 10b obtains the respective positions of the plural points.

The input receiver 10c receives the entry of characters based on the position touched by the user obtained by the position obtaining part 10b. The input receiver 10c receives the entry of the character associated with the character button in the position touched by the user.

The direction judging part 10d judges the direction of movement of the user when the user conducts an operation to move while touching the operation surface of the touch panel 2 (so-called a flick gesture). The direction judging part 10d judges the direction of the movement of the user based on the time-series change in the position touched by the user obtained by the position obtaining part 10b.

1-2. Entry of Characters

Next, the entry of characters into the on-vehicle apparatus 1 is explained. When the entry of characters is required for setting a destination in the navigation function, the processing mode on the on-vehicle apparatus 1 enters the input mode that receives the entry of characters. After the processing mode enters the input mode, the display controller 10a causes the display surface of the display 3 to display an entry screen only for the input mode.

Figure 3:
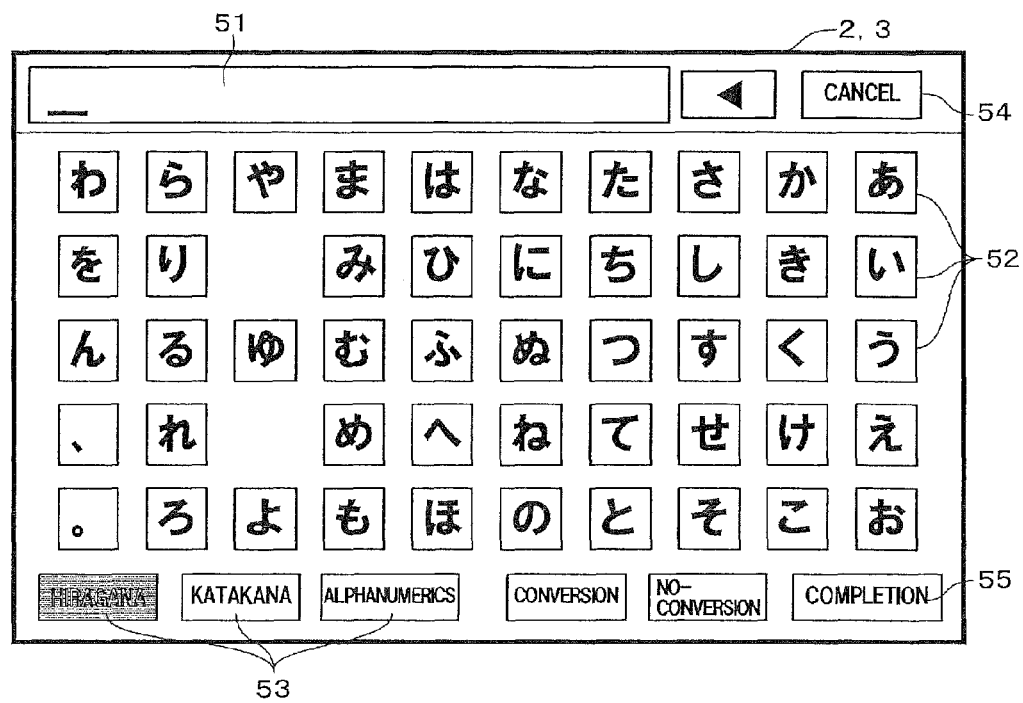
FIG. 3 shows an example of an entry screen.

FIG. 3 is an example figure of the entry screen displayed on the display surface of the display 3. FIG. 3 shows the entry screen to enter "Hiragana" used in Japanese.

As shown in FIG. 3, a text box 51 in which the characters entered by the user are displayed is disposed at the top of the entry screen. In the lower part of the text box 51, a plurality of character buttons 52 that are respectively associated with the characters which are the candidates for entry are disposed.

The entry screen includes command buttons such as change buttons 53 that change the type of characters to be entered (Hiragana, Katakana, and alphanumeric characters), a cancel button 54 that cancels the entry of a character, and a completion button 55 that determines the entered character. When the user touches the area of the cancel button 54 or the completion button 55, the input mode is finished.

Each of the plurality of character buttons 52 is associated with one of 46-basic kanas such as "SI," "HI," and "TU," and disposed in a predetermined position in accordance with the order of 50-character syllabary. Some of these character buttons 52 are associated with the 46-basic kanas and different types of characters from the 46-basic kanas. When a different type of character (dakuon, handakuon, or small-sized kanas) related to the associated basic kana exists, the character button 52 is associated with the different type of character.

For example, the character button 52 shown as "SI" is associated with two types of characters which are "SI" of basic kana and "JI" of dakuon. The character button 52 shown as "HI" is associated with three types of characters which are "HI" of basic kana, "BI" of dakuon and "PI" of handakuon. The character button 52 shown as "TU" of basic kana is associated with three types of characters which are "TU" of basic kana, "ZU" of dakuon and "tu" of small-sized kana.

In the initial state where the user has not conducted any operations such as a touch, only a basic kana among the associated characters is shown on each of the character buttons 52. Hereinafter, such a type of characters shown in the initial state is referred to as "ordinary characters." In the case of "Hiragana," the 46-basic kanas are the "ordinary characters." The types of characters other than the "ordinary characters" are referred to as "special characters." In the case of "Hiragana," dakuon, handakuon and small-sized kanas are the "special characters."

While such an entry screen is displayed, when the user touches the area of the character button 52, the input receiver 10c receives the entry of the characters associated with the character button 52 in the position touched by the user. Thus, the characters desired by the user are entered into the on-vehicle apparatus 1.

In the case where the user touches the area of the character button 52 associated with two or more types of characters, the input receiver 10c receives the entry of the character which varies in type depending on whether the user touches the area with a single point or plural points. Concretely, when the user touches the area of a certain character button 52 with a single point, the input receiver 10c receives the entry of an "ordinary character" associated with the character button 52. On the other hand, when the user touches the area of the identical character button 52 with two points, the input receiver 10c receives the entry of a "special character" associated with the character button 52.

Figure 4:
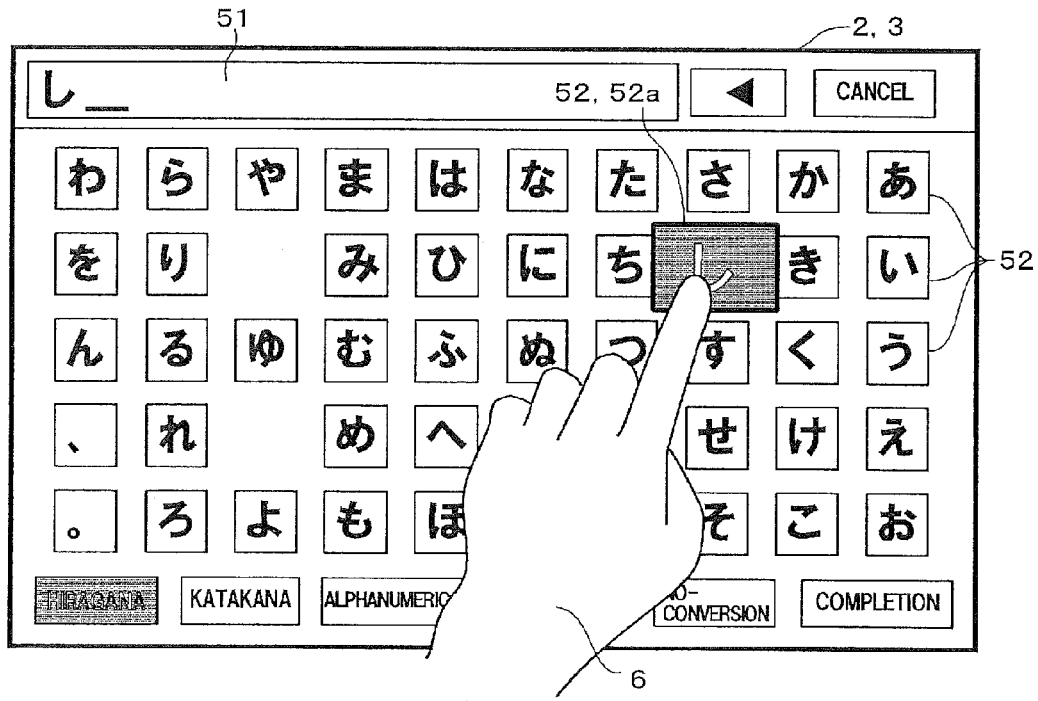
FIG. 4 shows an example user operation on the entry screen.

For example, as shown in FIG. 4, when a user 6 touches the area of the character button 52 shown as "SI" with a finger, the input receiver 10c receives the entry of "SI" that is the "ordinary character" associated with the character button 52. On the other hand, as shown in FIG. 5, when the user 6 touches the area of the character button 52 shown as "SI" with two fingers, the input receiver 10c receives the entry of "JI" that is the "special character" associated with the character button 52.

Thus, the user can enter an "ordinary character" when touching the area of the character button 52 with a single point, and the user can enter a "special character" when touching the area of the identical character button 52 with two points. Therefore, the user can easily enter a "special character" which is of a type different from an "ordinary character" simply by changing the number of fingers touching the area of the character button 52. Even when the user enters a "special character", the user can enter it with a single operation. Thus, the user can efficiently enter characters.

When the user touches the operation surface of the touch panel 2 with two fingers, the character button 52 that is in the center of the two points actually touched by the user may be judged as the character button 52 in the position touched by the user.

Figure 5:
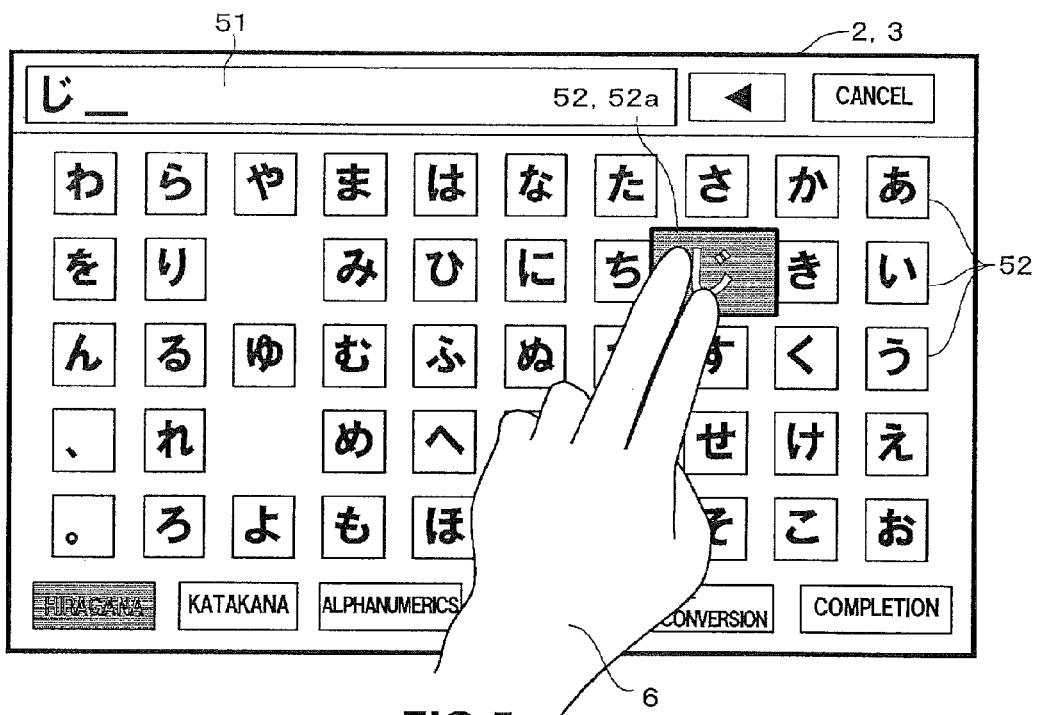
FIG. 5 shows another example user operation on the entry screen.

As shown in FIG. 4 and FIG. 5, while the user 6 is touching the area of the character button 52, the display controller 10a changes the appearance of the character button 52 in the position touched by the user 6 to emphasize the button rather than other character buttons 52. Concretely, the character button 52 in the position touched by the user 6 becomes a reversing character button 52a which is enlarged and reversed. As shown in FIG. 5, when the user 6 touches the area of the character button 52 with two points, a "special character" is shown on the reversing character button 52a in place of an "ordinary character." Then, at the time when the user 6 releases his/her finger(s) from the operation surface of the touch panel 2, the input receiver 10c receives the entry of the character shown on the reversing character button 52a. Thus, by emphasizing the character button 52 in the position touched by the user 6 rather than the other character buttons 52, the user can clearly comprehend that either character may be entered.

For the character buttons 52 that are associated with three or more types of characters, two types of characters are associated with the character buttons 52 as "special characters." Thus, when the user 6 touches the area of the character button 52 associated with three or more types of characters with two points, the display controller 10a displays the two types of "special characters" on the reversing character button 52a as the candidates for entry.

Figure 6:
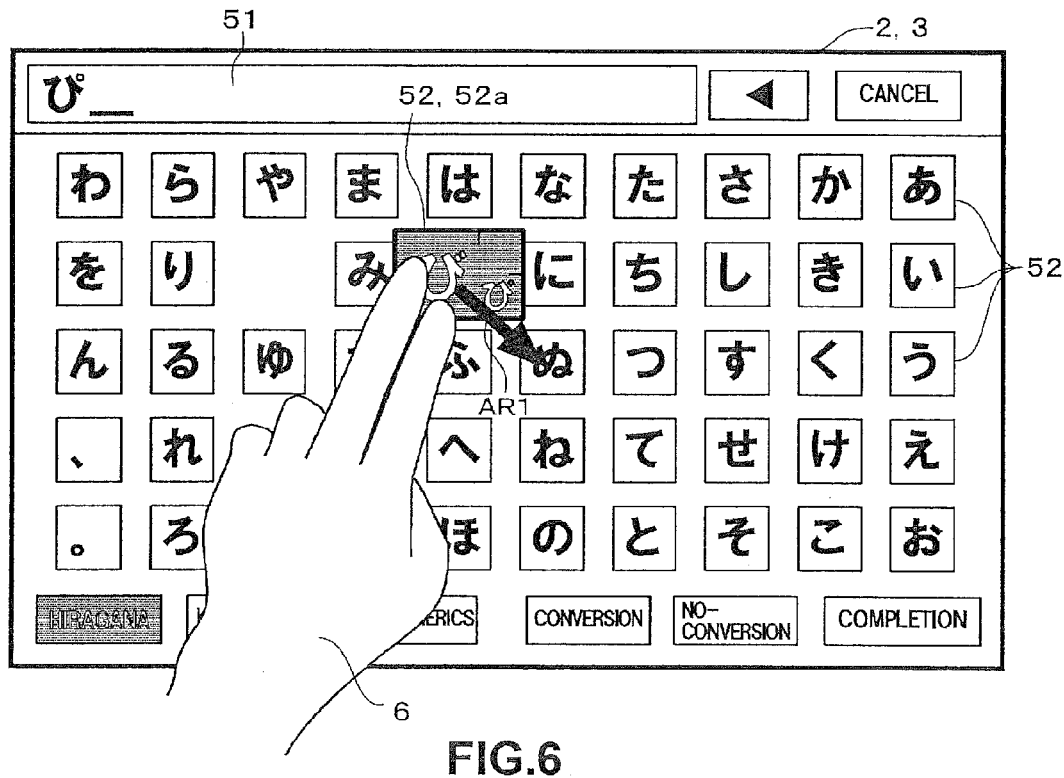
FIG. 6 shows another example user operation on the entry screen.
Figure 7:
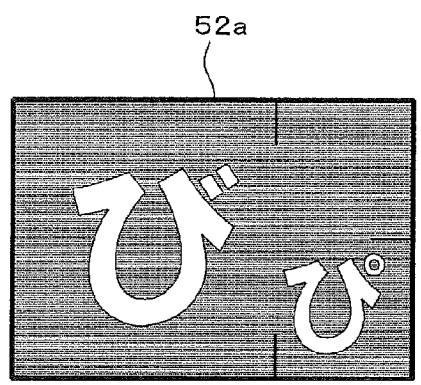
FIG. 7 shows an example of a reversing character button.

For example, FIG. 6 shows the case where the user 6 touches the area of the character button 52 shown as "HI" with two points. FIG. 7 shows the reversing character button 52a to be displayed at this time. As shown in the figures, two types of "special characters" which are "BI" of dakuon and "PI" of handakuon are shown on the reversing character button 52a. On the reversing character button 52a, the "BI" of dakuon is shown in a relatively large size, and the "PI" of handakuon is shown in a relatively small size.

As described above, when the two types of "special characters" are associated with the identical character button 52, the relatively frequently-used type of character is classified as a "first-priority character," and the relatively less-frequently-used type of character is classified as a "second-priority character." Then, on the reversing character button 52a, the "first-priority character" is shown in a relatively large size, and the "second-priority character" is shown in a relatively small size. The "second-priority character" is disposed, for example, in the lower-right area of the reversing character button 52a. In the case of the reversing character button 52a shown in FIG. 7, the "BI" of dakuon is the "first-priority character," and the "PI" of handakuon is the "second-priority character." Such an order of priority for the "special characters" may be registered in advance by the user.

In the case where the reversing character button 52a on which such two types of "special characters" are shown is displayed, when the user 6 releases his/her fingers from the operation surface of the touch panel 2 without moving from the initially-touched position, the input receiver 10c receives the entry of the "first-priority character." Therefore, for example, in the case where the reversing character button 52a shown in FIG. 7 is displayed, when the user 6 releases his/her fingers without moving from the touched position, the user 6 can enter "BI" of dakuon.

On the other hand, when the user 6 conducts an operation to move from the initially-touched position without releasing his/her finger(s) (so-called a flick gesture), the direction judging part 10d judges the direction of movement of the user 6. Then, when the direction of the movement of the user 6 is identical to the direction in which the "second-priority character" is disposed, the input receiver 10c receives the entry of the "second-priority character." That is, the input receiver 10c receives the entry of the "second-priority character" that is the type of character corresponding to the direction of the movement of the user 6.

Therefore, for example, in the case where the reversing character button 52a shown in FIG. 7 is displayed, as shown by the arrow AR 1 in FIG. 6, when the user 6 conducts the operation to move from the touched position toward the lower-right direction, the user 6 can enter "PI" of handakuon.

As described above, even when the two types of "special characters" are associated with the identical character button 52, both "first-priority character" and "second-priority character" can be entered with a single operation. Thus, characters can be entered efficiently. When the user touches the area of the character button 52 with three points, the input receiver 10c may receive the entry of the "second-priority character" associated with the character button 52.

1-3. Flow of Processing

Figure 8:
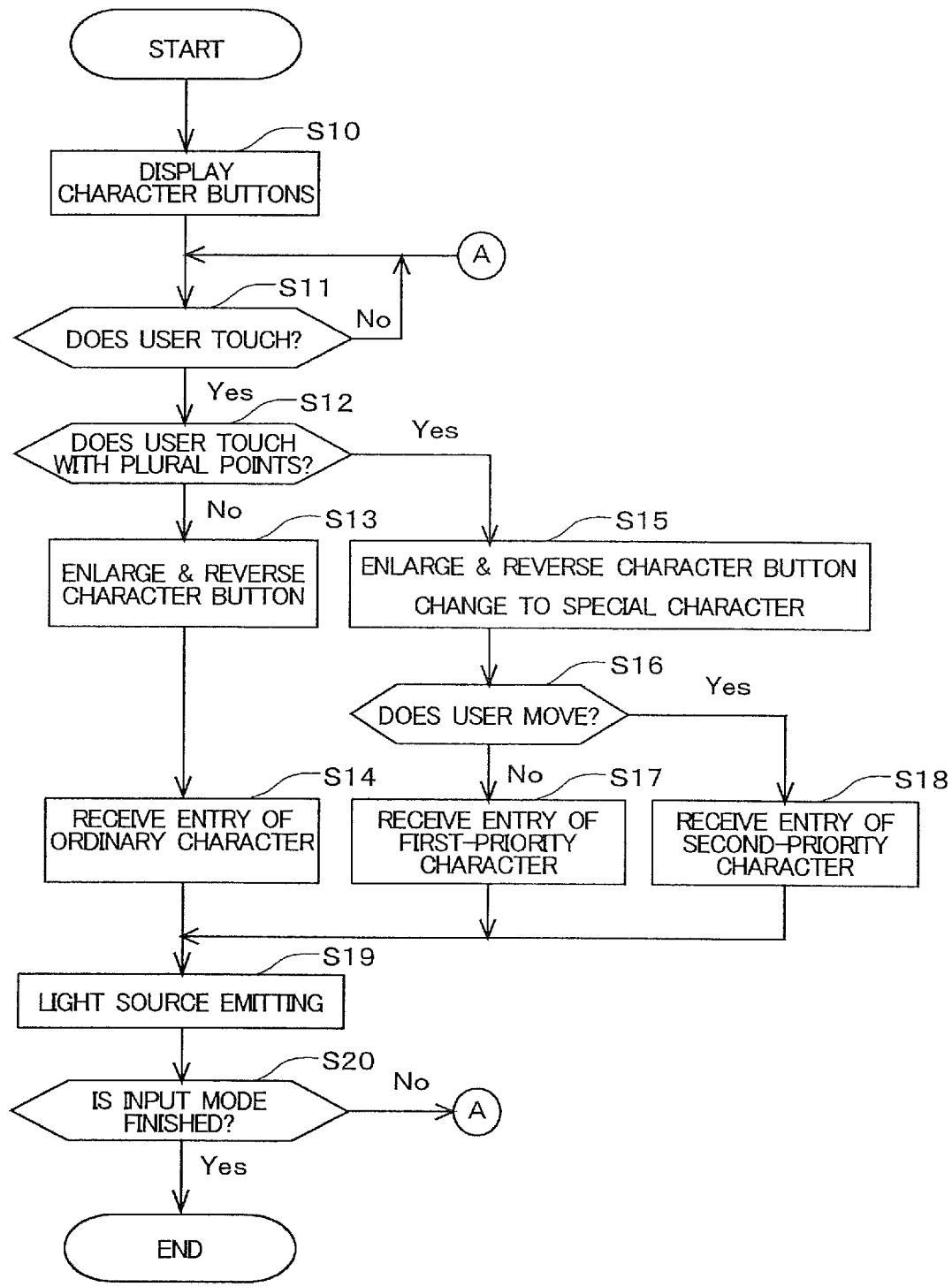
FIG. 8 shows a processing flow on the on-vehicle apparatus in the first embodiment.

FIG. 8 shows the flow of the processing on the on-vehicle apparatus 1 in the input mode. The processing is started when the processing mode of the on-vehicle apparatus 1 enters the input mode. Hereinafter, the flow of the processing on the on-vehicle apparatus 1 in the input mode is explained with reference to FIG. 8.

The display controller 10a first causes the display surface of the display 3 to display the entry screen only for the input mode (Refer to FIG. 3.). By displaying the plurality of character buttons 52, the display controller 10a causes the display surface of the display 3 to display the plural characters which are the candidates for entry (step S10). The "ordinary characters" are shown on the plurality of character buttons 52.

After the entry screen is displayed, the position obtaining part 10b waits a touch on the operation surface of the touch panel 2 by the user (step S11). The position obtaining part 10b judges whether the user touches the operation surface of the touch panel 2 based on the signal from the touch detector 21a of the touch panel controller 21.

When the user touches the operation surface of the touch panel 2 (Yes at the step S11), next, the position obtaining part 10b judges whether the user touches the operation surface with a single point or plural points (two points) (step S12).

When the user touches the operation surface of the touch panel 2, the touch detector 21a of the touch panel controller 21 judges whether the user touches the operation surface of the touch panel 2 either with a single point or plural points, and detects the position touched by the user. The touch detector 21a outputs the signal indicating the detected position touched by the user to the controller 10.

The position obtaining part 10b judges whether the user touches the operation surface either with a single point or plural points based on the signal from the touch detector 21a, and obtains the position touched by the user. When the user touches the operation surface of the touch panel 2 with a single point, the position obtaining part 10b obtains the position of the single point. When the user touches the operation surface with plural points, the position obtaining part 10b obtains the respective positions of the plural points.

When the user touches the operation surface with a single point (No at the step S12), next, the display controller 10a causes the display surface of the display 3 to display the reversing character button 52a that is the enlarged and reversed character button 52 in the position touched by the user (step S13). An "ordinary character" is shown on the reversing character button 52a. Then, at the time when the user releases his/her finger from the operation surface of the touch panel 2, the input receiver 10c receives the entry of the "ordinary character" associated with the character button 52 in the position touched by the user (step S14).

When the user touches the operation surface with plural points (two points) (Yes at the step S12), next, the display controller 10a enlarges and reverses the character button 52 in the position touched by the user, and further causes the display surface of the display 3 to display the reversing character button 52a whose notation is changed to at least one "special character" (step S15).

Next, the direction judging part 10d judges whether the user conducts an operation to move while touching the operation surface of the touch panel 2 (so-called a flick gesture) (step S16). The direction judging part 10d judges whether the user moves based on the time-series change in the position touched by the user obtained by the position obtaining part 10b.

When the user releases his/her fingers from the operation surface of the touch panel 2 without moving the fingers (No at the step S16), the input receiver 10c receives the entry of the "first-priority character" which is one of the "special characters" associated with the character button 52 in the position touched by the user (step S17).

On the other hand, when the user releases his/her fingers from the operation surface of the touch panel 2 after moving the fingers, the direction judging part 10d first judges the direction of movement of the user. The direction judging part 10d judges the direction of the movement of the user based on the time-series change in the position touched by the user obtained by the position obtaining part 10b.

When the direction of the movement of the user is identical to the direction in which the "second-priority character" is disposed, the input receiver 10c receives the entry of the "second-priority character" that is the type of character corresponding to the direction of the movement of the user. That is, the input receiver 10c receives the entry of the "second-priority character" that is the other one of the "special characters" associated with the character button 52 in the position touched by the user (step S18). When the direction of the movement of the user is not identical to the direction in which the "second-priority character" is disposed, the input receiver 10c may cancel the reception of the entry of characters.

In this way, when the input receiver 10e receives the entry of a character, next, the input receiver 10c transmits a signal to the light source 41 of the operation part 4, and causes the light source 41 to emit light (step S19). Thus, the on-vehicle apparatus 1 informs the user of the information that the entry of the character has been received. Since the user can easily comprehend that the on-vehicle apparatus 1 has received the entry of the character, operability may be improved.

The processing described above is repeated until the input mode is finished (step S20).

As mentioned above, on the on-vehicle apparatus 1, the plural characters which are the candidates for entry are displayed as the character buttons 52 on the display surface of the display 3 which corresponds to the operation surface of the touch panel 2. The touch detector 21a of the touch panel controller 21 judges whether the user touches the operation surface either with a single point or plural points, and detects the position touched by the user. The input receiver 10c receives the entry of a character associated with the character button 52 in the position touched by the user among the plural characters displayed on the display surface of the display 3. Then, the input receiver 10c receives the entry of the character which varies in type depending on whether the user touches the area in the operation surface corresponding to the identical character button 52 with a single point or plural points.

Therefore, by changing the number of fingers touching the operation surface, the user can easily enter a "special character" which is of a type different from an "ordinary character." That is, the user can enter the necessary characters quickly and comfortably without conducting the additional operation to enter characters which are of a type different from the characters to be displayed as the character buttons 52 in the initial state. Thus, the user can enter characters intuitively in accordance with his/her own will.

2. Second Embodiment

Next, a second embodiment is explained. The configuration and the processing on an on-vehicle apparatus 1 in the second embodiment are substantially the same as the ones of the first embodiment. Thus, hereinafter, the points different from the first embodiment are primarily explained. A touch panel controller 21 in the second embodiment can detect, as with the one in the first embodiment, a position touched by a user in an operation surface of a touch panel 2. Along with this, the touch panel controller 21 in the second embodiment can detect, when the user comes close to the operation surface of the touch panel 2 without contacting the operation surface, a position where the user comes close to the operation surface without contacting the operation surface in the operation surface. The method of the touch panel 2 in the second embodiment is, as with the one in the first embodiment, the electrostatic capacitance method that detects a position by measuring the change in electrostatic capacitance is adopted.

2-1. Proximity Detection

Figure 9:
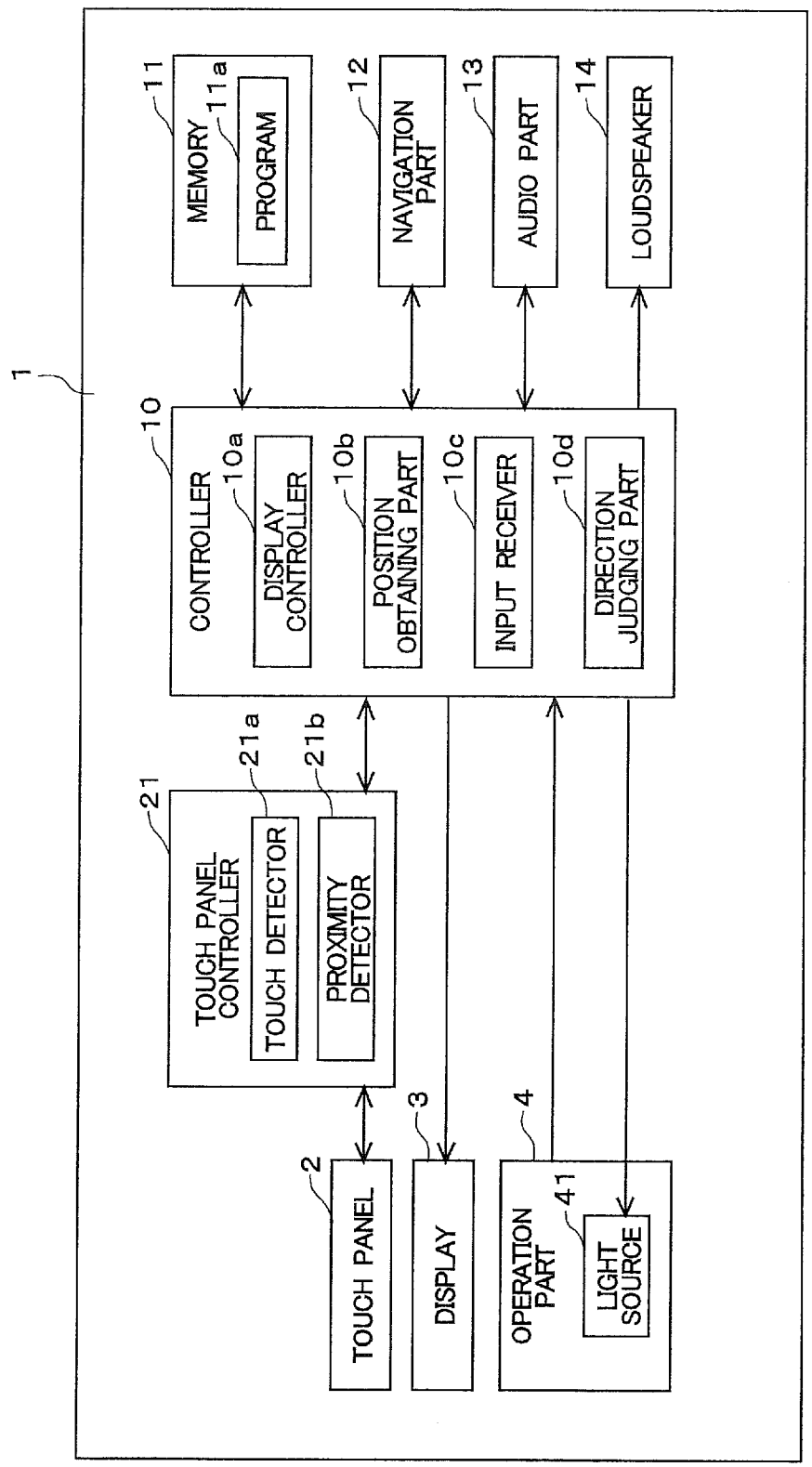
FIG. 9 is a block diagram illustrating a configuration of an on-vehicle apparatus in the second embodiment.

FIG. 9 is a block diagram showing a configuration of the on-vehicle apparatus 1 in the second embodiment. On the on-vehicle apparatus 1 in the second embodiment, in addition to a touch detector 21a, the touch panel controller 21 includes a proximity detector 21b that detects the position where the user comes close to the operation surface without contacting the operation surface based on the signal generated by the touch panel 2.

As mentioned above, the touch detector 21a detects the position contacted by the user in the operation surface of the touch panel 2 using the mutual capacitance method that measures the change in the electrostatic capacitance between the two electrodes. On the other hand, the proximity detector 21b detects the position where the user comes close to the operation surface without contacting the operation surface in the operation surface of the touch panel 2 using the self-capacitance method that measures the electrostatic capacitance combining with an electrode. Therefore, the touch panel controller 21 detects the user's position using a combination of the mutual capacitance method and the self-capacitance method.

The proximity detector 21b detects that the user comes close to the operation surface based on the increase in the electrostatic capacitance between the user's finger and the electrode in relation to the stray capacitance by the approach of the user's finger to the electrode. For example, when the user's fingertip exists within 40 mm from the operation surface of the touch panel 2, the proximity detector 21b can detect the position where the fingertip comes close to the operation surface. The proximity detector 21b can also detect the positions of up to two points as the positions where the user comes close to the operation surface without contacting the operation surface in the operation surface of the touch panel 2. Therefore, the proximity detector 21b can judge whether the user comes close to the operation surface of the touch panel 2 either with a single point or plural points (two points).

A position obtaining part 10b in this embodiment receives signals from the touch detector 21a of the touch panel controller 21, and signals from the proximity detector 21b. Thus, the position obtaining part 10b can obtain not only the position touched by the user in the operation surface of the touch panel 2 but also the position where the user comes close to the operation surface without contacting the operation surface in the operation surface of the touch panel 2. Since the operation surface of the touch panel 2 is disposed on the display surface of a display 3, the state where the user comes close to the operation surface of the touch panel 2 without contacting the operation surface may be referred to as the state where the user comes close to the display surface of the display 3 without contacting the display surface.

A display controller 10a in this embodiment identifies, based on the position where the user comes close to be detected in this way, one of the plurality of character buttons 52 in the position where the user comes close, as a vicinity button. The vicinity button is the character button 52 that is located nearest to the user's position. That is, the vicinity button is the character button 52 in the position in the operation surface contacted by the user when the user's position is moved to the orthogonal direction on the operation surface. When the operation surface is regarded as horizontal plane, the vicinity button may be referred to as the character button 52 that is located immediately below the user's position. The display controller 10*a* emphatically displays a character on the vicinity button identified in this way.

Figure 10:
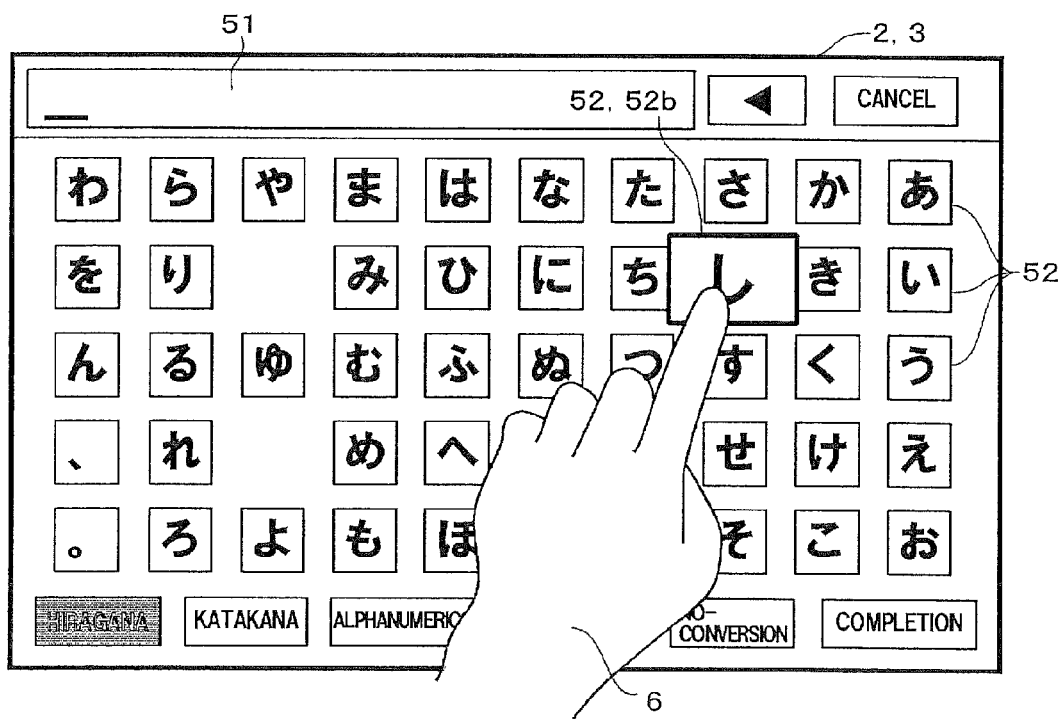
FIG. 10 shows another example user operation on the entry screen.

For example, FIG. 10 shows the case where a user 6 comes close to the vicinity of the character button 52 shown as "SI" with a finger without contacting the operation surface of the touch panel 2. In this case, the display controller 10*a* identifies the character button 52 shown as "SI" as a vicinity button 52*b* that is located nearest to the position of the user 6 based on the position where the user 6 comes close. Then, the display controller 10*a* changes the appearance of the identified vicinity button 52*b* so as to differentiate from the other character buttons 52. Concretely, the display controller 10*a* enlarges and emphasizes the vicinity button 52*b* rather than the other character buttons 52.

Figure 11:
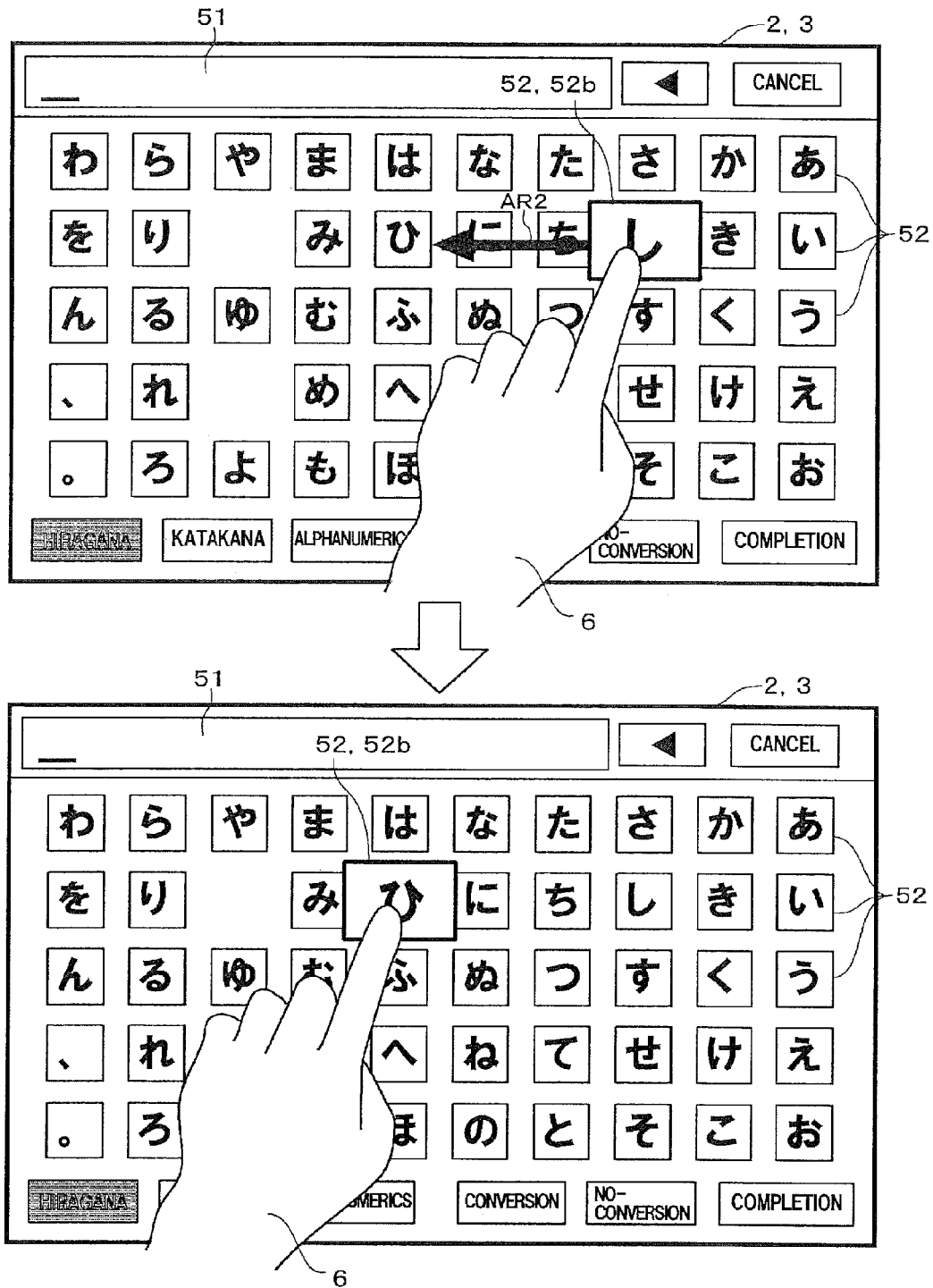
FIG. 11 shows another example user operation on the entry screen.

As shown by the arrow AR 2 in FIG. 11, when the user 6 moves his/her finger generally in parallel with the operation surface of the touch panel 2 without contacting the operation surface, the character button 52 that is located in the position where the user 6 comes close changes in accordance with the position of the user 6. Therefore, when the user 6 moves as described above, as shown on the lower side of FIG. 11, the display controller 10*a* newly identifies the character button 52 that is located in the position where the user 6 comes close after moving the finger as the vicinity button 52*b*, and emphasizes the identified vicinity button 52*b*. Thus, the character button 52 that is located nearest to the position of the user 6 is always emphasized as the vicinity button 52*b*.

When the user 6 naturally touches the operation surface from the position of the user 6, the vicinity button 52*b* becomes the character button 52 in the position touched by the user 6. For example, when the user 6 touches the operation surface of the touch panel 2 under the condition shown in FIG. 10, as shown in FIG. 4, the user 6 touches the area of the character button 52 shown as "SI." In this case, therefore, the user can enter "SI" associated with the character button 52.

As described above, on the on-vehicle apparatus 1 in the second embodiment, when the user comes close to the operation surface of the touch panel 2 without contacting the operation surface, the character on the vicinity button 52*b* in the position where the user comes close to the operation surface is emphatically displayed among the plurality of character buttons 52. Thus, the user can comprehend that either character may be entered when the user touches the operation surface of the touch panel 2, in advance before touching the operation surface. Therefore, incorrect operations by the user can be prevented effectively.

When the user comes close to the operation surface of the touch panel 2 with two points, the display controller 10*a* causes the display 3 to display at least one of "special characters" in place of an "ordinary character" as the character(s) shown on the vicinity button 52*b*.

Figure 12:
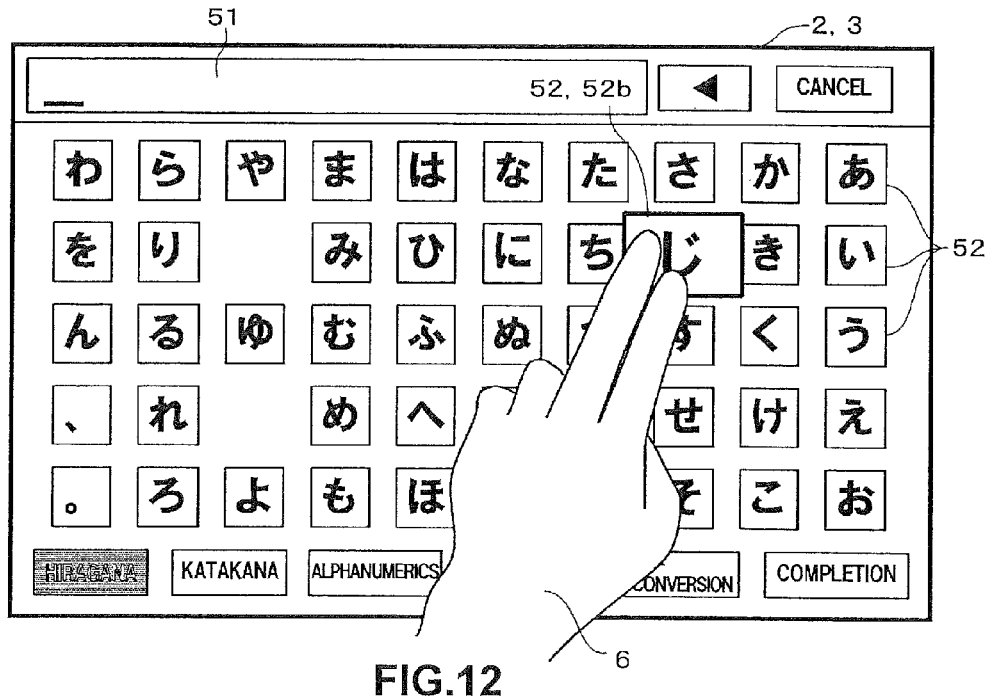
FIG. 12 shows another example user operation on the entry screen.
Figure 13:
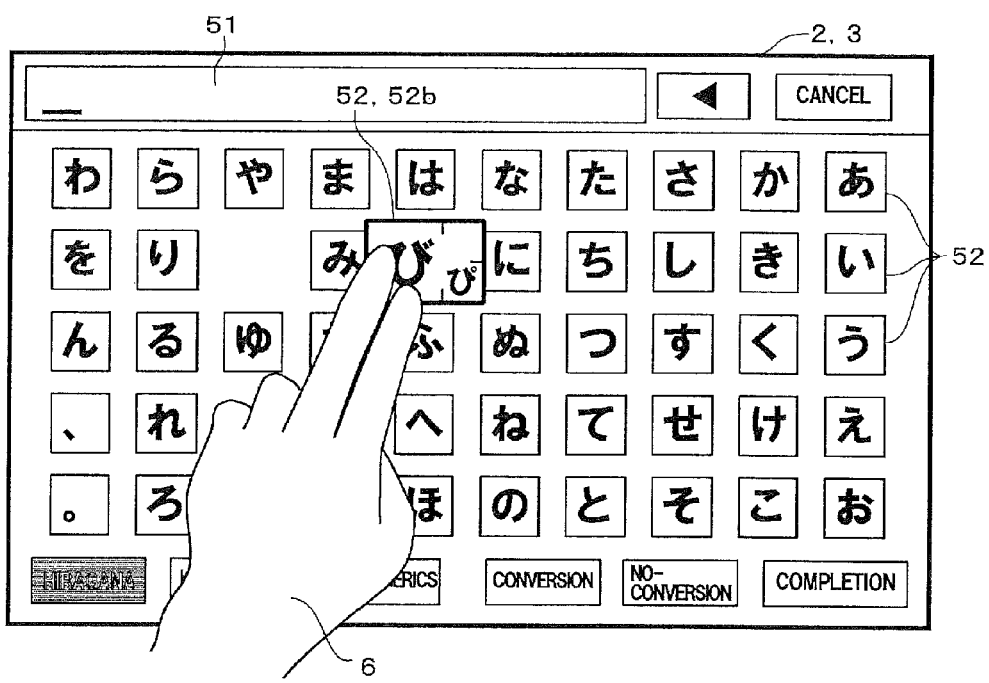
FIG. 13 shows another example user operation on the entry screen.

For example, FIG. 12 shows the case where the user 6 comes close to the vicinity of the character button 52 shown as "SI" with two fingers, without contacting the operation surface of the touch panel 2. In this case, the display controller 10*a* displays "JI" of dakuon that is a "special character" on the vicinity button 52*b*. FIG. 13 shows the case where the user 6 comes close to the vicinity of the character button 52 shown as "HI" with two fingers, without contacting the operation surface of the touch panel 2. In this case, the display controller 10*a* displays "BI" of dakuon and "PI" of handakuon that are "special characters" on the vicinity button 52*b*.

As described above, when the user 6 comes close to the operation surface of the touch panel 2 with two points, at least one "special character" is displayed in place of an "ordinary character" as the character(s) shown on the vicinity button 52*b*. Thus, the user can comprehend that either type of character may be entered when the user touches the operation surface of the touch panel 2 with plural points, in advance before touching the operation surface. Therefore, incorrect operations by the user can be prevented effectively. For example, under the condition shown in FIG. 12, when the user 6 touches the operation surface of the touch panel 2 with two fingers, as shown in FIG. 5, the user can enter "JI" that is a "special character."

2-2. Flow of Processing

Figure 14:
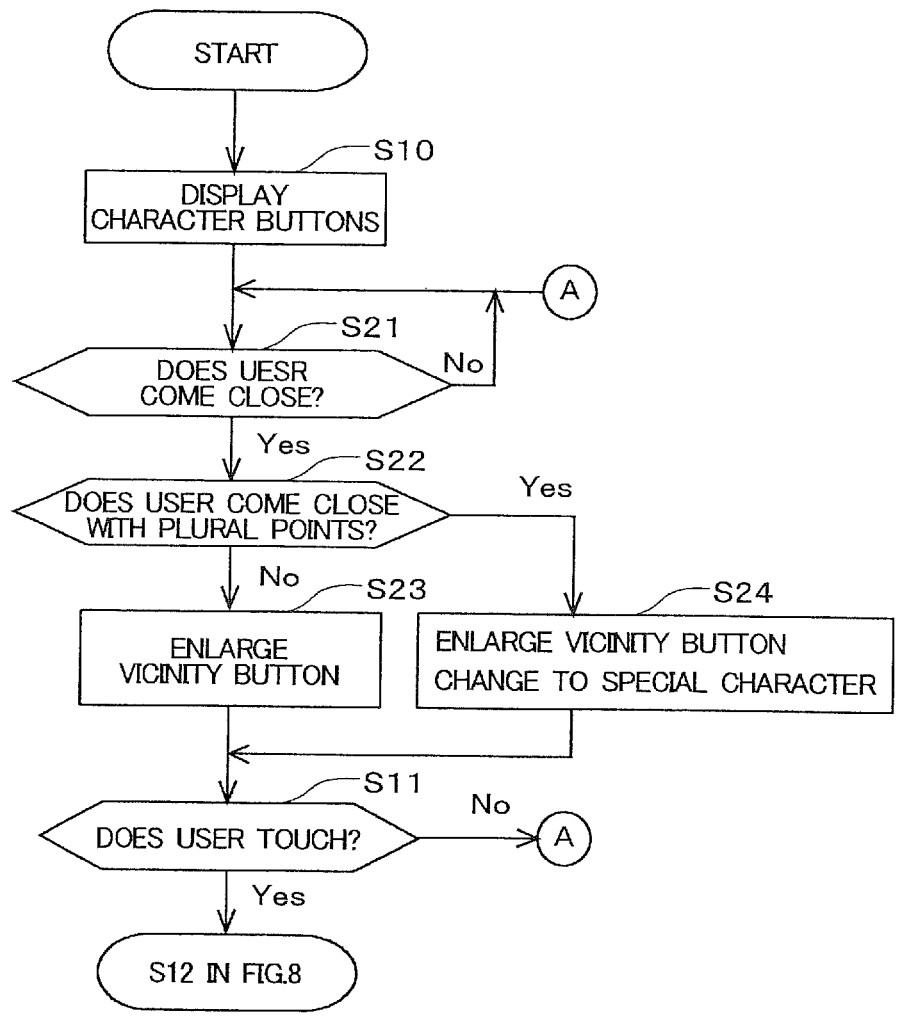
FIG. 14 shows a processing flow on the on-vehicle apparatus in the second embodiment.

FIG. 14 shows the flow of the processing on the on-vehicle apparatus 1 in the input mode of the second embodiment. The processing includes a step S21, a step S22, a step S23, and a step S24 inserted between the step S10 and the step S11 in the processing on the on-vehicle apparatus 1 in the first embodiment shown in FIG. 8. Therefore, the processing after the user touches the operation surface of the touch panel 2 is the same as the processing of the first embodiment. Hereinafter, the flow of the processing on the on-vehicle apparatus 1 in the input mode of the second embodiment is explained with reference to FIG. 14.

The display controller 10*a* first causes the display surface of the display 3 to display an entry screen including the plurality of character buttons 52 (step S10).

After the entry screen is displayed, the position obtaining part 10*b* waits for the user to come close to the operation surface of the touch panel 2 (step S21). The position obtaining part 10*b* judges whether the user comes close to the operation surface of the touch panel 2 based on the signal from the proximity detector 21*b* of the touch panel controller 21.

When the user comes close to the operation surface of the touch panel 2 (Yes at the step S21), next, the position obtaining part 10*b* judges whether the user comes close to the operation surface with a single point or plural points (two points) (step S22).

When the user comes close to the operation surface of the touch panel 2, the proximity detector 21*b* of the touch panel controller 21 judges whether the user comes close to the operation surface of the touch panel 2 either with a single point or plural points, and detects the position where the user comes close to the operation surface. The proximity detector 21*b* outputs a signal indicating the detected position where the user comes close to the operation surface, to the controller 10.

The position obtaining part 10*b* judges whether the user comes close to the operation surface either with a single point or plural points, based on the signal from the proximity detector 21*b*, and obtains the position where the user comes close to the operation surface. When the user comes close to the operation surface of the touch panel 2 with a single point, the position obtaining part 10*b* obtains the position of the single point. When the user comes close to the operation surface with two points, the position obtaining part 10*b* obtains the positions of the two points.

When the user comes close to the operation surface with a single point (No at the step S22), next, the display controller 10*a* identifies one of the plurality of character buttons 52 in the position where the user comes close to the operation surface, as the vicinity button 52*b*. Then, the display controller 10a enlarges the vicinity button 52b and causes the display 3 to display the enlarged vicinity button 52b (step S23). The display controller 10a causes the display 3 to display an "ordinary character" as the character shown on the vicinity button 52b.

On the other hand, when the user comes close to the operation surface with plural points (two points) (Yes at the step S22), next, the display controller 10a identifies one of the plurality of character buttons 52 in the position where the user comes close to the operation surface, as the vicinity button 52b. Then, the display controller 10a enlarges the vicinity button 52b, and further changes the notation from an "ordinary character" to at least one "special character" (step S24). Thus, the display controller 10a causes the display 3 to display at least one "special character" as the character(s) shown on the vicinity button 52b.

As described above, the display 3 displays the character which varies in type depending on whether the user comes close to the area in the display surface corresponding to the identical character button 52 with a single point or plural points. Thus, the user can easily comprehend each of the type of characters which can be entered with a single-touch and the type of characters which can be entered with the multi-touch.

The processing described above is repeated until the user touches the operation surface of the touch panel 2 (step S11). Therefore, when the user moves in the state where the user is close to the operation surface of the touch panel 2, the character button 52 that is located nearest to the user's position is constantly emphasized as the vicinity button 52b. When the user touches the operation surface of the touch panel 2 (Yes at the step S11), the processing of and after the step S12 in FIG. 8 is performed.

As mentioned above, on the on-vehicle apparatus 1 in the second embodiment, the proximity detector 21b can detect the position where the user comes close to the operation surface without contacting the operation surface in the operation surface of the touch panel 2. Then, the display controller 10a emphasizes the vicinity button 52b in the position where the user comes close among the plurality of character buttons 52 and causes the display surface of the display 3 to display the vicinity button 52b. Thus, the user can comprehend either character associated with the character button 52 may be entered when the user touches the operation surface of the touch panel 2, in advance before touching the operation surface.

The proximity detector 21b is also capable of judging whether the user comes close to the operation surface of the touch panel 2 either with a single point or plural points. In the case where the user comes close to the operation surface with plural points, the display controller 10a causes the display surface of the display 3 to display a "special character" that is a type of character which the input receiver 10c receives the entry when the user touches the operation surface with plural points, as the character to be shown on the vicinity button 52b. Thus, the user can comprehend that either type of character may be entered when the user touches the operation surface of the touch panel 2 with plural points, in advance before touching the operation surface.

3. Modifications

The embodiments of the invention are explained above. However, the invention is not limited to the embodiments described above, and various modifications are possible. Hereinafter, examples of those modifications are explained. All the forms including the aforementioned embodiments and modifications explained below can be arbitrarily combined.

In the embodiments described above, when the on-vehicle apparatus 1 informs the user of the information that the entry of a character has been received, the light source 41 emits light. However, the on-vehicle apparatus 1 may inform the user of the information by another method such as outputting a beep via the loudspeaker 14.

Further, in the second embodiment described above, the vicinity button 52b is emphasized in contrast to the other character buttons 52 by enlarging the vicinity button 52b. However, the vicinity button 52b may be emphasized by another method such as changing the color or the shape of the vicinity button 52b.

Further, in the embodiments described above, by conducting an operation to touch the command button for instructing the conversion of the type after entering an "ordinary character," the user may enter a "special character" such as dakuon, handakuon, and small-sized kanas. This will allow the user to use a user-friendly input method selectively.

Figure 15:
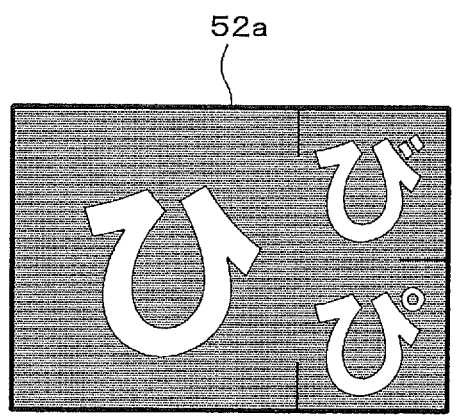
FIG. 15 shows another example of the reversing character button.

Further, in the embodiments described above, when the user touches the area of the character button 52 with plural points, the user can enter a "special character" only. However, when the user touches the area of the character button 52 with plural points, both an "ordinary character" and a "special character" may be entered. For example, when the user touches the area of the character button 52 shown as "HI" with plural points, the reversing character button 52a showing the "ordinary character" in a relatively large size and the "special characters" in a relatively small size respectively as shown in FIG. 15 is displayed. Then, when the user releases his/her fingers without moving the fingers from the touched position, the user can enter "HI" that is the "ordinary character." On the other hand, when the user moves from the touched position, the user can enter the "special character" of "BI" or "PI" in accordance with the direction of the movement. The user can enter "BI" of dakuon when moving from the touched position to the upper-right direction, and can enter "PI" of handakuon when moving to the lower-right direction.

Further, in the embodiments described above, up to two types of "special characters" are associated with the identical character button 52. However, three or more types of "special characters" may be associated with the identical character button 52. In this case, the character buttons or the like on which these three or more types of "special characters" are shown in the different positions may be displayed so as to enter the type of "special character" corresponding to the direction of the movement from the position touched by the user.

When two or more types of "special characters" are associated with the identical character button 52, the user may change the type of character to be entered by repeatedly touching the area of the character button 52 with plural points. For example, when the user initially touches the area of the character button 52 shown as "HI" with plural points, the user may enter "BI" of dakuon, and subsequently, when the user touches the area of the character button 52 with plural points, the user may enter "PI" of handakuon.

Further, in the embodiments described above, the "ordinary characters" are 46-basic kanas, and the "special characters" are dakuon, handakuon and small-sized kanas. However, the "ordinary characters" may be "Hiragana," and the "special characters" may be "Katakana." According to this, even in the case where the user temporarily enters "Katakana" while entering "Hiragana" and returns to the entry of "Hiragana" again, the user can directly enter the necessary characters without conducting a complicated operation. Thus, the user can enter characters quickly and comfortably.

Figure 16:
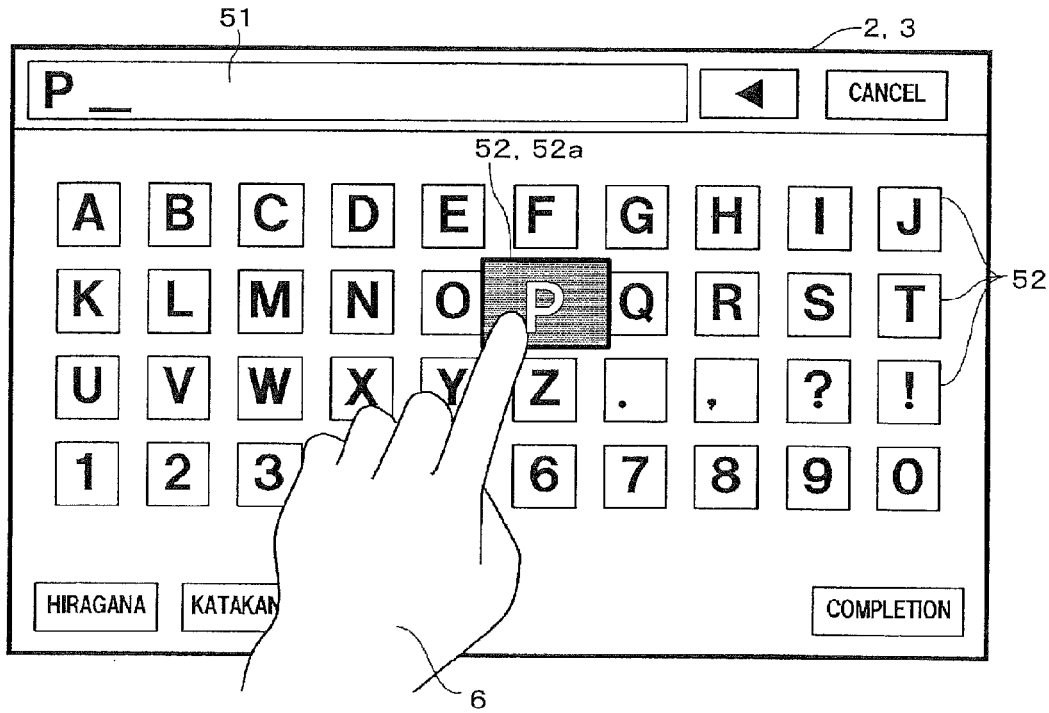
FIG. 16 shows another example user operation on the entry screen.
Figure 17:
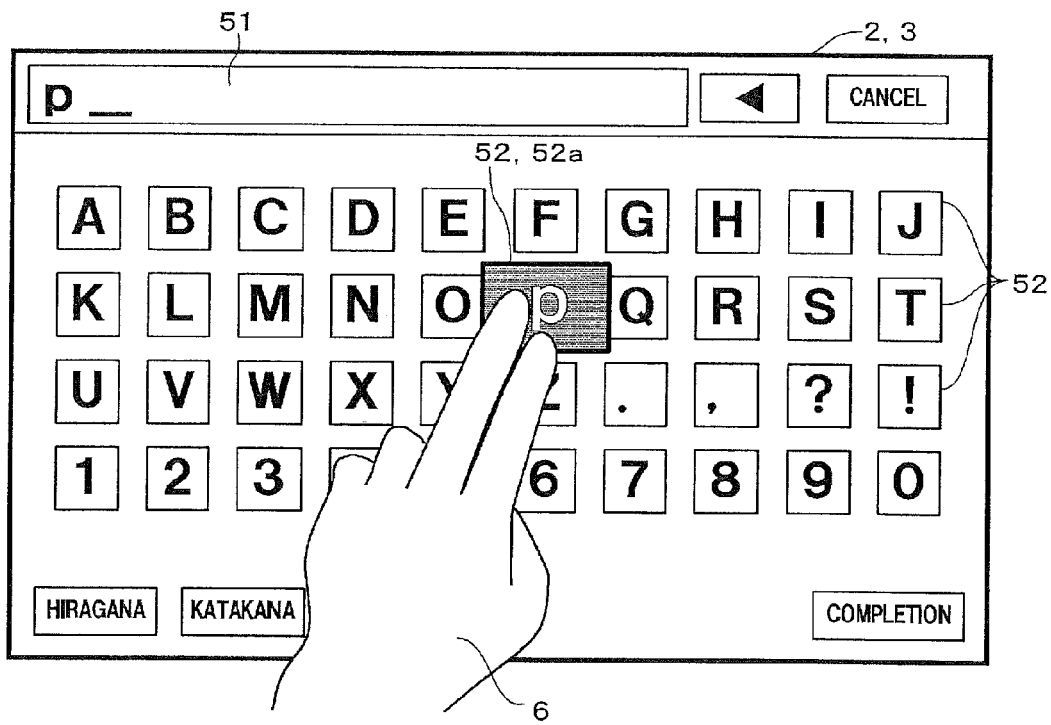
FIG. 17 shows another example user operation on the entry screen.

Further, in the embodiments described above, the case where the user enters "Hiragana" is explained. However, even in the case where the user enters other types of characters such as the "alphabets" used in English and the like, the aforementioned technology can be applied. When entering the "alphabets," one of the "upper case letters" and the "lower case letters" may be the "ordinary characters," and the other may be the "special characters." For example, as shown in FIG. 16, when the user touches the area of the character button 52 with a single point, the user can enter an "upper case letter" as an "ordinary character." Then, as shown in FIG. 17, when the user touches the area of the character button 52 with plural points, the user can enter a "lower case letter" as a "special character." According to this, even in the case where the user enters a sentence in which the "upper case letters" and the "lower case letters" are mixed, the user can directly enter the necessary characters without conducting a complicated operation. Thus, the user can enter characters quickly and comfortably.

Figure 18:
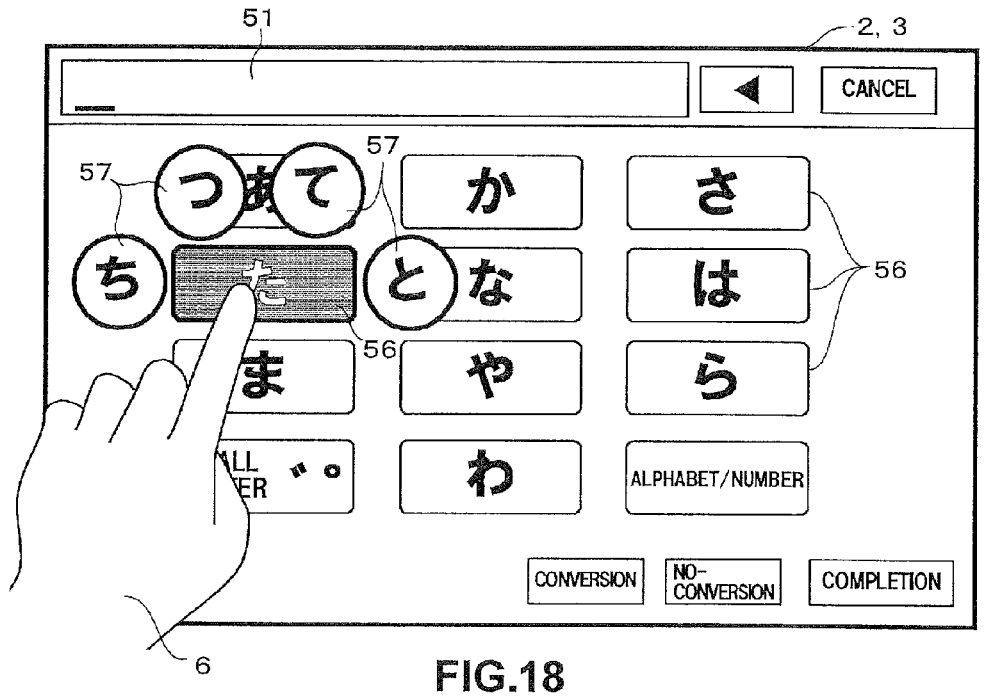
FIG. 18 shows another example user operation on the entry screen.

Further, in the embodiments described above, the entry screen on which the plurality of character buttons 52 are disposed in accordance with the order of 50-character syllabary is used. However, as shown in FIG. 18 and FIG. 19, a plurality of character buttons 56 may be disposed in the arrangement of numeric keypad.

In this case, the character buttons 56 on which characters of "A-row" are shown are displayed in the initial state. Then, when the user 6 touches the area of one of the character buttons 56, a plurality of character guides 57 on which other characters each of which has a consonant common to that of the character shown on the character button 56 are shown are displayed. The plurality of character guides 57 are displayed in the directions different from each other around the character button 56. For example, as shown in FIG. 18, when the user 6 touches the area of the character button 56 shown as "TA" with a single point, the character guides 57 on which other characters of "TA-column" ("TI," "TU," "TE," and "TO") are shown are displayed. When the character guides 57 are displayed, by moving the finger from the touched position, the user 6 can enter a character of the character guides 57 corresponding to the direction of the movement of the user 6.

Figure 19:
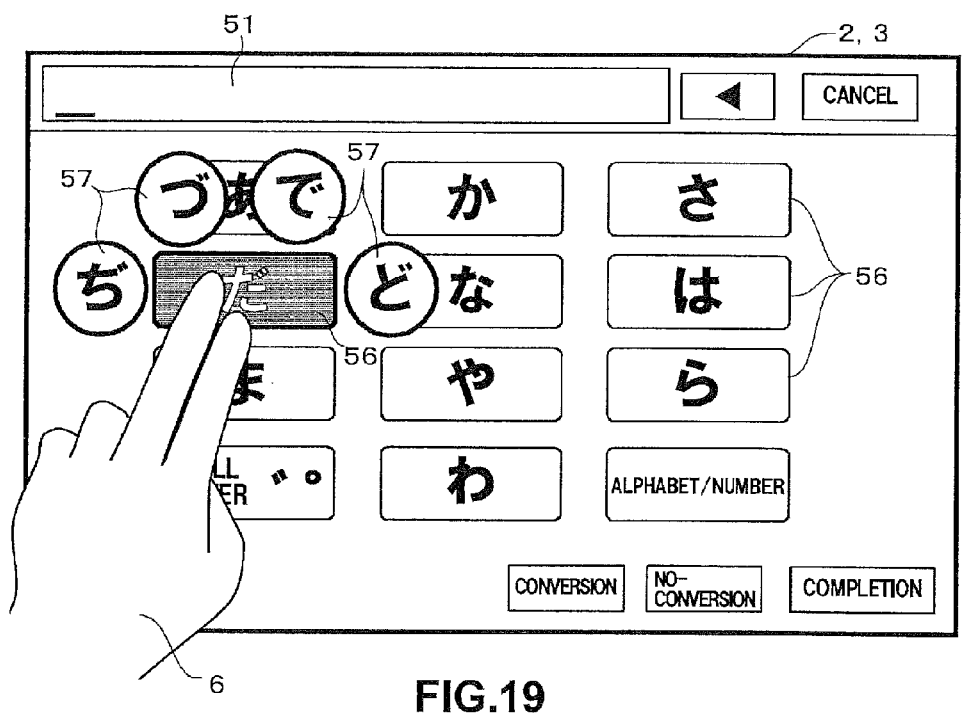
FIG. 19 shows another example user operation on the entry screen.

As shown in FIG. 19, when the user 6 touches the area of the character button 56 shown as "TA" with two points, "DA" of dakuon is displayed as the character shown on the character button 56. Furthermore, the character guides 57 on which other characters of "DA-column" ("DI," "DU," "DE," and "DO") are shown are displayed around the character button 56. In this case also, by moving the fingers from the touched position, the user 6 can enter a character of the character guides 57 corresponding to the direction of the movement. As described above, in this case, the user can easily enter a "special characters" which is of a type different from an "ordinary character" by changing the number of fingers touching the operation surface. When the user comes close to the operation surface of the touch panel 2 without contacting the operation surface, the same character guides 57 may be displayed.

Figure 20:
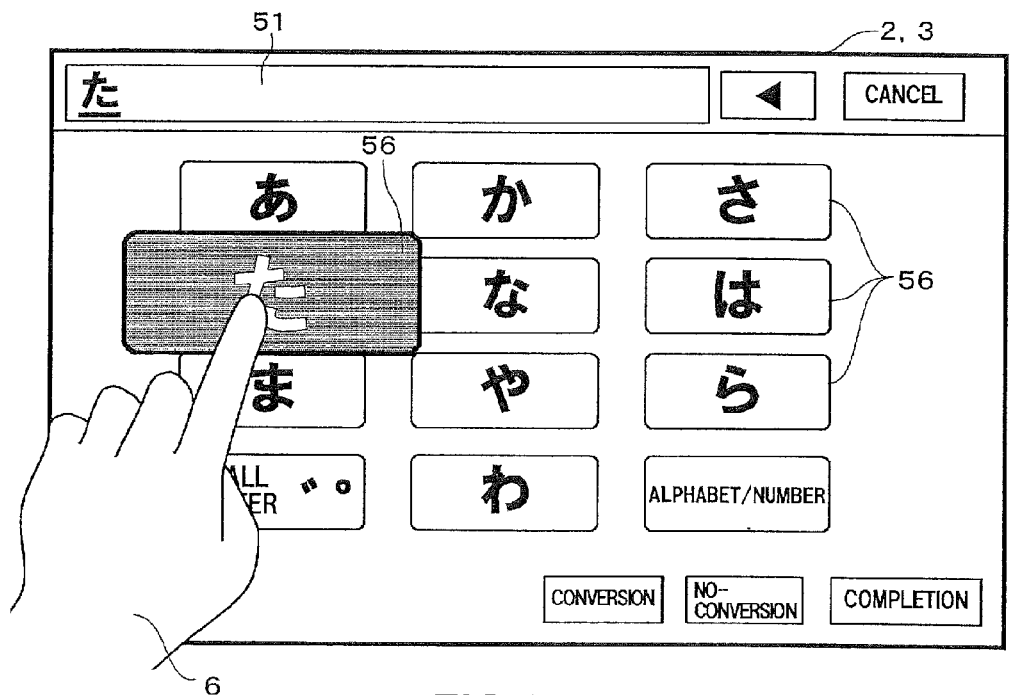
FIG. 20 shows another example user operation on the entry screen.
Figure 21:
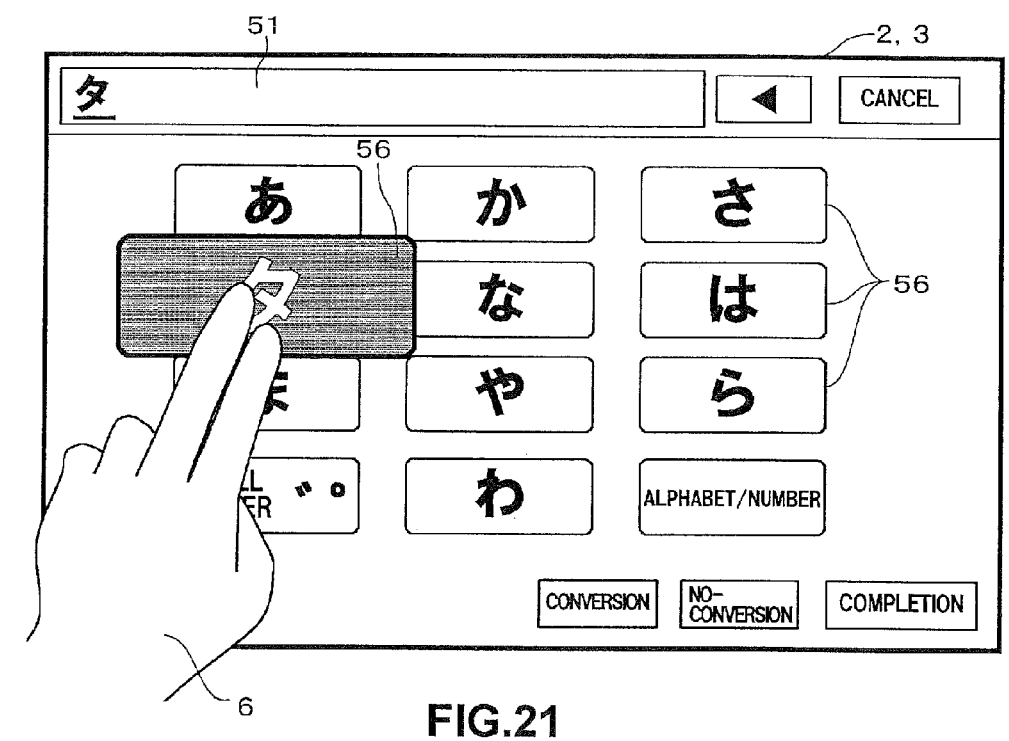
FIG. 21 shows another example user operation on the entry screen.

For example, when the user touches the area of the character button 56 with a single point, "Hiragana" may be entered as an "ordinary character" as shown in FIG. 20. When the user touches the area of the character button 56 with plural points, as shown in FIG. 21, "Katakana" may be entered as a "special character."

Further, in the second embodiment described above, the position where the user comes close to the operation surface without contacting the operation surface in the operation surface of the touch panel 2 is detected by the self-capacitance method. However, the position may be detected by another method such as an infrared method.

Further, in the embodiments described above, it is explained that the user touches the operation surface of the touch panel 2 with his/her finger(s). However, the user may touch the operation surface by use of a touch tool such as a touch pen. In this case, the position of the touch tool may be regarded as the user's position.

Further, in the embodiments described above, the on-vehicle apparatus 1 is explained as an example of the character input apparatus. However, any kind of character input apparatus such as a smartphone or a tablet terminal may be applied, if it is the electronic apparatus that is capable of entering characters by use of the touch panel.

Furthermore, it is explained in the aforementioned embodiments that the different functions are performed by arithmetic processing performed by the CPU in accordance with a program. However, a part of the functions may be implemented by an electrical hardware circuit. On the other hand, a part of the functions performed by a hardware circuit in the aforementioned embodiments may be performed by software.

While the invention has been shown and described in detail, the foregoing description is in all aspects illustrative and not restrictive. It is therefore understood that numerous other modifications and variations can be devised without departing from the scope of the invention.

What is claimed is:

1. A character input apparatus comprising:
   a display having a touch panel and that displays a plurality of characters which are candidates for entry on a display surface corresponding to an operation surface of the touch panel, each of the characters being displayed in a corresponding area of the display that is associated with the character;
   a first touch panel control circuit configured to judge whether a user touches one of the corresponding areas of the operation surface that is associated with a particular one of the characters either with a single point or with plural points;
   a second touch panel control circuit configured to judge whether the user comes close to the one of the corresponding areas of the display surface that is associated with the particular one of the characters either with the single point or with the plural points without contacting the display surface; and
   a processor coupled to the display and to the first and second touch panel control circuits, the processor configured to (i) control the display to display a first version of the particular one of the characters in the corresponding area associated with the particular one of the characters when the user comes close to the corresponding area in the display surface associated with the particular one of the characters with the single point without contacting the display surface, and to display a second version of the particular one of the characters, different from the first version, in the corresponding area associated with the particular one of the characters when the user comes close to the corresponding area in the display surface associated with the particular one of the characters with the plural points without contacting the display surface, and (ii) receive an entry of the particular one of the characters associated with the corresponding area touched by the user among the plurality of characters, wherein
   the processor (a) receives the entry of the first version of the particular one of the characters when the user touches the corresponding area in the operation surface associated with the particular one of the characters with the single point and (b) receives the entry of the second version of the particular one of the characters when the user touches the corresponding area in the operation surface associated with the particular one of the characters with the plural points.

2. The character input apparatus of claim 1, wherein the processor causes the display to emphatically display a character in the position where the user comes close among the plurality of characters.

3. The character input apparatus of claim 1, wherein the processor judges a direction of movement of the user when the user moves while touching the operation surface, and
when the user moves while touching the corresponding area of the operation surface with the plural points, the processor causes the display to display, in the corresponding area, a plurality of alternative types of the character associated with the corresponding area, and the processor receives the entry of one of the plurality of alternative types of the corresponding character located in the direction of the movement of the user.

4. The character input apparatus of claim 1, further comprising:
an informing part that informs the user of information when the processor receives the entry of the character.

5. A character input method comprising the steps of:
(a) displaying a plurality of characters which are candidates for entry on a display surface corresponding to an operation surface of a touch panel of a display, each of the characters being displayed in a corresponding area of the display that is associated with the character;
(b) judging whether a user comes close to one of the corresponding areas of the display surface that is associated with a particular one of the characters either with a single point or with plural points without contacting the display surface;
(c) judging whether the user touches the one of the corresponding areas of the operation surface that is associated with the particular one of the characters either with the single point or with the plural points; and
(d) receiving an entry of the particular one of the characters associated with the corresponding area touched by the user among the plurality of characters, wherein
the step (b) controls the display to display a first version of the particular one of the characters in the corresponding area associated with the particular one of the characters when the user comes close to the corresponding area in the display surface associated with the particular one of the characters with the single point without contacting the display surface, and to display a second version of the particular one of the characters, different from the first version, in the corresponding area associated with the particular one of the characters when the user comes close to the corresponding area in the display surface associated with the particular one of the characters with the plural points without contacting the display surface, and
the step (d) (i) receives the entry of the first version of the particular one of the characters when the user touches the corresponding area in the operation surface associated with the particular one of the characters with the single point and (ii) receives the entry of the second version of the particular one of the characters when the user touches the corresponding area in the operation surface associated with the particular one of the characters with the plural points.

6. The character input method of claim 5, wherein the step (a) emphatically displays a character in the position where the user comes close among the plurality of characters.

7. The character input method of claim 5, further comprising the step of:
(e) judging a direction of movement of the user when the user moves while touching the operation surface, wherein
when the user moves while touching the corresponding area of the operation surface with the plural points, the corresponding area displaying a plurality of alternative types of the character associated with the corresponding area, the step (d) receives the entry of one of the plurality of alternative types of the corresponding character located in the direction of the movement of the user.

8. The character input method of claim 5, further comprising the step of:
(f) informing the user of information when the step (c) receives the entry of the character.

9. A non-transitory computer-readable recording medium that stores a program to be executed by a computer, the program causing the computer to execute the steps of:
(a) causing a display surface corresponding to an operation surface of a touch panel of a display to display a plurality of characters which are candidates for entry, each of the characters being displayed in a corresponding area of the display that is associated with the character;
(b) judging whether a user comes close to one of the corresponding areas of the display surface that is associated with a particular one of the characters either with a single point or with plural points without contacting the display surface;
(c) judging whether a user touches the one of the corresponding areas of the operation surface that is associated with the particular one of the characters either with the single point or with the plural points; and
(d) receiving an entry of the particular one of the characters associated with the corresponding area touched by the user among the plurality of characters, wherein
the step (b) controls the display to display a first version of the particular one of the characters in the corresponding area associated with the particular one of the characters when the user comes close to the corresponding area in the display surface associated with the particular one of the characters with the single point without contacting the display surface, and to display a second version of the particular one of the characters, different from the first version, in the corresponding area associated with the particular one of the characters when the user comes close to the corresponding area in the display surface associated with the particular one of the characters with the plural points without contacting the display surface, and
the step (d) (i) receives the entry of the first version of the particular one of the characters when the user touches the corresponding area in the operation surface associated with the particular one of the characters with the single point and (ii) receives the entry of the second version of the particular one of the characters when the user touches the corresponding area in the operation surface associated with the particular one of the characters with the plural points.

10. The non-transitory recording medium of claim 9, wherein the step (a) emphatically displays a character in the position where the user comes close among the plurality of characters.

11. The non-transitory recording medium of claim 9, wherein
the program further causes the computer to execute the step of:
(e) judging a direction of movement of the user when the user moves while touching the operation surface, and when the user moves while touching the corresponding area of the operation surface with the plural points, the corresponding area displaying a plurality of alternative types of the character associated with the corresponding area, the step (c) receives the entry of one of the plurality of alternative types of the corresponding character located in the direction of the movement of the user.

12. The non-transitory recording medium of claim 9, wherein
the program further causes the computer to execute the step of:
(f) informing the user of information when the step (c) receives the entry of the character.

\* \* \* \* \*